US005084518A

United States Patent [19]
George et al.

[11] Patent Number: 5,084,518
[45] Date of Patent: Jan. 28, 1992

[54] POLYKETONE POLYMER BLENDS OF A LINEAR ALTERNATING POLYMER OF CARBON MONOXIDE AND AT LEAST ONE ETHYLENICALLY UNSATURATED HYDROCARBON WITH AN AMORPHOUS POLYAMIDE

[75] Inventors: Eric R. George; William H. Korcz, both of Houston, Tex.

[73] Assignee: Shell Oil Company, Houston, Tex.

[21] Appl. No.: 571,392

[22] Filed: Aug. 23, 1990

[51] Int. Cl.$^5$ .............. C08F 8/30; C08F 283/00; C08F 283/04; C08G 69/48

[52] U.S. Cl. .............. 525/184; 525/421; 525/539

[58] Field of Search .............. 525/184, 421, 539

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,404,317 | 9/1983 | Epstein et al. | 524/538 |
| 4,410,661 | 10/1983 | Epstein et al. | 525/66 |
| 4,536,541 | 8/1985 | Latham | 525/66 |
| 4,800,129 | 1/1989 | Deak | 428/474.4 |
| 4,839,437 | 6/1989 | Gergen et al. | 525/426 |
| 4,843,144 | 6/1989 | Van Broekhoven et al. | 528/392 |
| 4,851,473 | 7/1989 | Dunphy | 525/66 |
| 4,874,819 | 10/1989 | George et al. | 525/185 |
| 4,880,903 | 11/1989 | Van Broekhoven et al. | 528/392 |

FOREIGN PATENT DOCUMENTS

| | | |
|---|---|---|
| 070001 | 7/1982 | European Pat. Off. . |
| 073036 | 8/1982 | European Pat. Off. . |
| 309095 | 6/1988 | European Pat. Off. . |
| 1081304 | 8/1967 | United Kingdom . |

*Primary Examiner*—Harold D. Anderson
*Assistant Examiner*—T. Mosley
*Attorney, Agent, or Firm*—Denise Y. Wolfs

[57] ABSTRACT

Improved compositions comprise polymer blends of a linear alternating polymer of carbon monoxide and at least one ethylenically unsaturated hydrocarbon with an amorphous polyamide, and, optionally, an acidic polymer containing moieties of an $\alpha$-olefin and an $\alpha\beta$-ethylenically unsaturated carboxylic acid. The blends demonstrate improved transparency.

18 Claims, No Drawings

POLYKETONE POLYMER BLENDS OF A LINEAR ALTERNATING POLYMER OF CARBON MONOXIDE AND AT LEAST ONE ETHYLENICALLY UNSATURATED HYDROCARBON WITH AN AMORPHOUS POLYAMIDE

FIELD OF THE INVENTION

This invention relates to polyketone blends, and, more particularly, to blends of a polyketone and at least one amorphous polyamide.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. U.K. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketon polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

SUMMARY OF THE INVENTION

The present invention provides blends of a linear alternating polymer of carbon monoxide and at least one ethylenically unsaturated hydrocarbon with an amorphous polyamide. More particularly, the invention provides blends of (1) the linear alternating polymer with (2) an amorphous polyamide having a glass transition temperature (Tg) of from about 90° C. to about 200° C., and, optionally, (3) an acidic polymer containing moieties of an α-olefin and an α,β-ethylenically unsaturated carboxylic acid, optionally containing a third polymerizable monomer and wherein, optionally, a portion of the carboxylic acid groups are neutralized with non-alkali metal. The subject invention also includes monolayer or multiple layer films prepared from these blends. The blends of the invention exhibit greater transparency, without compromising the mechanical properties of the polyketone polymer. Transparency is a desirable property in a variety of applications such as, for example, packaging applications.

DESCRIPTION OF THE INVENTION

The polyketone polymers of the blends of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketon terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

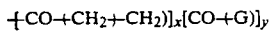

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO+CH$_2$CH$_2$+ units and the —CO+G+ units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[-di(2-methoxyphenyl)phosphino]-propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

A second component of the blends of the invention is an amorphous polyamide having a high glass transition temperature ($T_g$). The term "amorphous polyamide" is well known to those skilled in the art, and refers to polymers distinct from the crystalline or semicrystalline polymers. Nylons 6, 9, 11, and 12, for example, are crystalline polymers and have readily determined crystalline melting points. Such semicrystalline nylons may also have amorphous regions, and may even have measurable $T_g$s, but they are not thereby included in this invention.

The amorphous polyamides of the invention are those in which either the diamine or the diacid moiety is aromatic, and the other moiety is aliphatic. That is, an aliphatic diamine can generally be combined with an aromatic diacid, or an aromatic diacid can generally be combined with an aliphatic diamine to give suitable amorphous polyamides. The aliphatic groups of these polyamides preferably contain 4 to 8 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms. Polyamides prepared from aliphatic diamines with aliphatic diacids are the traditional semi-crystalline nylons and are therefore not a part of this invention. Polyamides prepared from aromatic diamines and aromatic diacids are also known. However, certain of these all-aromatic polyamides are known to be intractable under ordinary melt processing conditions, and thus are not normally suitable in the subject invention.

Examples of suitable diamines that can be used to prepare the amorphous polyamide polymers include the following: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethycyclohexane, p-xylylenediamine, m-phenylenediamine, p-phenylenediamine, and alkyl substituted m-phenylenediamine and p-phenylenediamine.

Examples of suitable dicarboxylic acids that can be used to prepare the amorphous polyamide polymers include the following: isophthalic acid, terephthalic acid, alkyl substituted iso- and terephthalic acid, adipic acid, sebacic acid, butane dicarboxylic acid, and the like.

The diamines and diacids mentioned above can be combined as desired, provided the resulting polyamide is amorphous. Not all aromatic/aliphatic combinations will necessarily be suitable. The amorphous polyamides suitable for this invention, more specifically, are amorphous polyamides which have a $T_g$ significantly above room temperature. For most applications the $T_g$ of the amorphous polyamide (as measured in the dry state) should be in the range of about 90° C. to about 200° C., and preferably from about 100° C. to about 165° C. Measurement of the $T_g$ of the amorphous polyamide can easily be done with a differential scanning calorimeter (DSC). Amorphous polyamides, as described above, normally have $T_g$s of around 125° C. when dry, diminishing somewhat with increased humidity.

Specific examples of amorphous polyamides which are useful for this invention include: poly(hexamethylenediamine isophthalamide), hexamethylenediamine isophthalamide terephthalamide copolymer, having isophthalic terephthalic moiety ratios of 100:0 to 60:40, mixtures of 2,2,4-and 2,4,4-trimethylhexamethylenediamine terephthalamide, copolymers of hexamethylene diamine and 2-methylpentamethylenediamine with iso- or terephthalamide, copolymers of hexamethylene diamine and 2-methylpentamethylenediamine with iso- or terephthalic acids or mixtures of these acids. Polyamides based on hexamethylenediamine isoterephthalamide containing high levels of terephthalic acid may also be useful provided a second diamine such as 2-methyldiaminopentane is incorporated to produce a processible amorphous polymer. (As used herein, the term "copolymer" includes within its meaning terpolymers and high polymers.)

More particularly, the amorphous polyamide comprises:

(A) 40 to 98 mole percent units of isophthalic acid based on total acids present, (B) 2 to 60 mole percent units of terephthalic acid based on total acids present, (C) 50 to 98 mole percent units of hexamethylene diamine based on total amines present; and (D) 2 to 50 mole percent units, based on total amines present, of at least one aliphatic diamine containing between 8 and 20 carbon atoms and containing at least one cyclohexane moiety, wherein in the amorphous polyamide the mole percent phthalic acids present totals 100 percent and the mole percent diamines present totals 100 percent, and wherein up to 40 weight percent of the amorphous polyamide may consist of units of a lactam, or an ω-aminoacid of 4 to 12 carbon atoms, or units derived from a 4 to 12 carbon atoms aliphatic dicarboxylic acid and a 2 to 12 carbon atom aliphatic diamine.

The amorphous polyamide preferably comprises 60 to 90 mole percent units of isophthalic acid and 10 to 40 mole percent units of terephthalic acid, based on total acids present, and 80 to 98 mole percent units of hexamethylene diamine and 2 to 20 mole percent units of at least one other aliphatic diamine, containing between 8 and 20 carbon atoms and containing at least one cyclohexane moiety, based on total amines present. The amorphous polyamides exhibit melt viscosities at 280° C. of less than 30,000 poise, and preferably less than 20,000 poise, measured at a shear stress of $10^5$ dynes/cm$^2$.

The amorphous polyamides of the present invention are prepared by condensation polymerization, which is well known to those skilled in the art. The amorphous polyamides can be prepared by known polymer condensation methods in the composition ratios mentioned above. In order to form high polymers the total moles of the acids employed should equal the total moles of the diamines employed.

Representative aliphatic diamines containing 8 to 20 carbon atoms and at least one cyclohexane moiety or nucleus include 1-amino-3-aminomethyl-3,5,5-trimethylcyclohexane, i.e.,

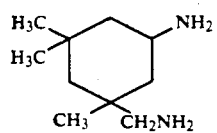

1,4-bis(aminomethyl)cyclohexane, i.e.,

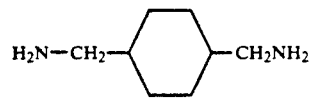

bis(p-aminocyclohexyl)methane, i.e.,

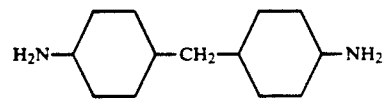

and the like. As normally made, the 1-amino-3-aminomethyl-3,5,5-trimethylcyclo-hexane and 1,4-bis(aminomethyl)cyclohexane are mixtures of the cis and trans isomers. Any isomer ratio may be used in this invention. Bis(p-aminocyclohexyl)methane, which can be used as one of the diamine components in this invention, is usually a mixture of three stereoisomers. Any ratio of the three may be used in this invention.

The polymerization to prepare the amorphous polyamide may be performed in accordance with known polymerization techniques, such as melt polymerization, solution polymerization and interfacial polymerization techniques, but it is preferred to conduct the polymerization in accordance with melt polymerization procedures. This procedure produces polyamides having high molecular weights. In melt polymerization, the 8 to 20 carbon cycloaliphatic diamine, hexamethylene diamine, terephthalic acid and isopthalic acid are mixed in such amounts that the ratio of the diamine components and the dicarboxylic acid components will be substantially equimolar and that the composition of these monomers will satisfy the mole percents above. Up to 40 percent by weight of optional monomers may be included as desired, such as caprolactam, laurolactam, ω-aminocaproic acid, ω-aminoundecanoic acid, or a salt of 4 to 12 carbon alkylene dicarboxylic acids and 2 to 12 carbon alkylene diamines. The components are heated at temperatures higher than the melting point of the resulting polyamide but lower than the degradation temperature thereof. Because of the volatility of the hexamethylene diamine, a slight excess is usually employed in the mix. The heating temperature is in the range of 170° to 300° C. The pressure can be in the range of from atmospheric pressure to 300 psig.

The method of addition of starting monomers is not critical. For example, salts of a combination of the diamines and acids can be made and mixed. It is also possible to disperse a mixture of the diamines in water, add a prescribed amount of a mixture of acids to the dispersion at an elevated temperature to form a solution of a mixture of polyamide salts, and subject the solution to the polymerization. If desired, a monovalent amine or, preferably, an organic acid, may be added as viscosity adjuster to a mixture of starting salts or an aqueous solution thereof.

The precise percentage of the amorphous polyamide to be employed in a blend of the invention will depend upon the anticipated end use for the blend. Compositions containing from about 0.5 wt % up to about 10 wt %, based on total blend, of the amorphous polyamide are believed to be satisfactory, with 0.5 wt % to 5 wt % being preferred, and 0.5 wt % to 1.5 wt % being most preferred.

Amorphous polyamides of the type described in U.S. Pat. No. 4,404,317, incorporated herein by reference, and in European Patent Application 309,095, incorporated herein by reference, are particularly useful in the subject invention. Amorphous polyamides commercially available from DuPont under the trademark SELAR ® are useful in the subject invention. SELAR PA, an amorphous polyamide useful as a barrier in packaging applications, is particularly useful in the subject invention.

The optional, third polymeric component of the blends of the invention, present as a minor component if present at all, is an acidic polymer containing moieties of an α-olefin and an α,β-ethylenically unsaturated carboxylic acid, optionally polymerized with a third monomer, and optionally having a portion of the carboxylic acid groups neutralized with non-alkali metal. The amount of the optional third component will suitably be up to about 10 wt % based on the total polymer blend. Amounts of the optional blend component up to about 5 wt % on the same basis are preferred.

The α-olefin monomer of this acidic polymer is an α-olefin of up to 10 carbon atoms inclusive such as ethylene, propylene, 1-butene, isobutylene, 1-octene and 1-decane. Preferred α-olefins are straight chain α-olefins of up to 4 carbon atoms inclusive and most preferred is ethylene. The α-olefin monomer of the acidic polymer is present in at least 65 mol % based on total blend component and is preferably present in at least 80 mol % on the same basis.

The ethylenically unsaturated carboxylic acid monomer is an α,β-ethylenically unsaturated carboxylic acid of up to 10 carbon atoms inclusive and is illustrated by acrylic acid, 2-hexenoic acid and 2-octenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated carboxylic acid monomer is present in an amount from about 1 wt % to about 35 wt % based on total blend component, but amounts from about 5 mol % to about 20 mol % on the same basis are preferred.

The acidic polymer is suitably a copolymer of the α-olefin and the unsaturated carboxylic acid, and in general such copolymers are preferred. On occasion, however, it is useful to incorporate as a third monomer a non-acidic, low molecular weight polymerizable monomer of up to 8 carbon atoms inclusive. This third monomer may be another α-olefin such as propylene or styrene when the major α-olefin monomer is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated, the presence of this third monomer is optional and is not required. Amounts of the third monomer of up to about 5 mol %, based on total blend component, are satisfactory, with amounts of up to about 3 mol % on the same basis being preferred.

Independent of whether the acidic polymer is a copolymer or a terpolymer, in an optical embodiment a portion of the carboxylic acid groups is neutralized with non-alkali metal. When partially neutralized, the acidic polymer, although polymeric in form, exhibits ionic character and is conventionally referred to as a metal ionomer. In the partially neutralized embodiment, the acidic polymer is reacted with a source of ionizable zinc, aluminum or magnesium compound sufficient to neutralize from about 10% to about 90%, preferably from about 20% to about 80%, of the carboxylic acid groups present in the polymer. Such neutralization results in a uniform distribution of the metal throughout the polymer.

The ionizable metal compound utilized in the neutralization is a source of complexed or uncomplexed non-alkali metal ions including zinc, aluminum, or magnesium ions. Such ions are provided by compounds of the type known as metal salts, e.g., uncomplexed metal ion salts such as zinc acetate, zinc chloride or zinc formate, or complexed metal ion salts in which the metal is bonded to two types of groups, at least one of which is readily ionizable. Illustrative of such complexed metal ion salts are mixed zinc salts with one weak acid such as oleic acid or stearic acid and one more ionizable acid such as acetic acid or formic acid. In general, neutralization with a complexed non-alkali metal ion is preferred.

The optionally partially neutralized acidic polymers employed as an optional polymeric blend component are broadly conventional and many are commercial. Copolymers of ethylene and methacrylic acid are marketed by DuPont under the trademark NUCREL® and copolymers of ethylene and acrylic acid are marketed by Dow under the trademark PRIMACORE®. Partially neutralized polymers are marketed by DuPont under the trademark SURLYN®.

The blends of the invention may also include additives such as antioxidants and stabilizers, dyes, fillers or reinforcing agents, fire resistant materials, mold release agents, colorants and other materials designed to improve the processability of the polymers or the properties of the resulting blend. Such additives are added prior to, together with or subsequent to the blending of the polyketone and the amorphous polyamide.

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by methods such as extrusion and injection molding into sheets, films, plates and shaped parts. Illustrative of such applications are the production of articles useful in both rigid and flexible packaging applications. Specific applications include films, containers, and bottles, which may be made by thermoforming injection or extrusion blow molding, etc.

The blends of the invention exhibit increased transparency relative to the unblended polyketone, while maintaining the polyketone's good mechanical properties. While not wishing to be bound by any particular theory, it is speculated that the amorphous polyamide either reduces the crystallinity of the polyketone polymer, or acts as a nucleating agent to reduce the crystal size of the polyketone polymer.

The transparency of a polymer may be determined by measuring the relative portion of light transmitted through a film or plaque by a method such as ASTM #D1003 "Haze and Luminous Transmittance of Transparent Plastics". Although the transparency of the blends of the invention may be determined by this method, the transparency of the blends of the invention can be readily observed visually.

The invention is further illustrated by the following Examples which should not be regarded as limiting.

EXAMPLE 1

A linear alternating terpolymer of carbon monoxide, ethylene, and propylene (88/008) was produced in the presence of a catalyst composition formed from palladium acetate, trifluoroacetic acid and 1,3-bis[di(2-methoxyphenyl)phosphino]propane. The polyketone polymer had a melting point of about 223° C. and an LVN of about 1.73 dl/g when measured in m-cresol at 60° C. The polyketone polymer also contained 0.5% Irganox 1076.

EXAMPLE 2

Blends were prepared of the polyketone terpolymer of Example 1 and an amorphous polyamide, SELAR® PA, available from DuPont. The blends prepared are shown in Table 1. The blends were compounded on a Haake 30 mm co-rotating twin screw extruder, operating at 300 RPM with melt temperatures between 240° and 270° C. Subsequent to blending, specimens of the blends were molded into plaques on a 25 ton Arburg injection molding machine. Molded specimens were stored over desiccant until tested. Mechanical testing was performed on "dry as molded" specimens.

TABLE 1

| Composition (Polyketone/ Polyamide) | Tensile and Impact Properties | | | | | | | | |
|---|---|---|---|---|---|---|---|---|---|
| | Tensile Strength | | | | Flexural Modulus (PSI) | Notched Izod (ft-lb/in) | | Gardner Impact (in-lb) | |
| | Yield (PSI) | Elongation at Yield (%) | Break (PSI) | Elongation at Break (%) | | Room Temp. | −30° C. | Room Temp. | −20° F. |
| 100/0 | 9400 | 19 | 7600 | 61 | 318,000 | 4.2 | 1.4 | 309 | 121 |
| 99/1 | 9100 | 18 | 8000 | 137 | 288,000 | 4.6 | 1.4 | 276 | 59 |
| 95/5 | 9300 | 17 | 7800 | 81 | 326,000 | 4.3 | 1.4 | >320 | 123 |
| 80/20 | 9400 | 14 | 8700 | 63 | 374,000 | 5.0 | 1.4 | 320 | 14 |

Tensile and impact properties are shown in Table 1. Mechanical properties of the polyketone polymer were relatively unchanged or improved by the addition of 1 to 5 wt % of the amorphous polyamide. The sample containing 20 wt % amorphous polyamide was unstable and barely moldable, and also demonstrated an unsuitably low Gardner impact value.

An unexpected property, exhibited by the blend containing 1% amorphous polyamide, was the improved transparency of the molded plaques, relative to the unblended polyketone polymer. The increased transparency was significant enough to be visually observed.

What is claimed is:

1. A composition comprising a blend of
   (1) a major proportion of a linear alternating polymer of carbon monoxide and at least one ethylenically unsaturated hydrocarbon,
   (2) a lesser proportion of an amorphous polyamide, wherein the amorphous polyamide comprises:
      (a) 40 to 98 mole percent units of isophthalic acid based on total acids present;
      (b) 2 to 60 mole percent units of terephthalic acid based on total acids present;
      (c) 50 to 98 mole percent units of hexamethylene diamine based on total amines present; and
      (d) 2 to 50 mole percent units, based on total amines present, of at least one aliphatic diamine containing between 8 and 20 carbon atoms and containing at least one cyclohexane moiety;
   wherein in the amorphous polyamide the mole percent phthalic acids present totals 100 percent and the mole percent diamines present totals 100 percent, and
   (3) up to about 10 wt %, based on the total blend, of an acidic polymer incorporating moieties of α-olefin and α,β-ethylenically unsaturated carboxylic acid.

2. The composition of claim 1 wherein the linear alternating polymer is represented by the repeating unit formula $$\text{—[CO—[CH}_2\text{—CH}_2\text{]]}_x\text{[CO—[G]]}_y\text{—}$$

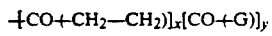

wherein G is a moiety of an ethylenically unsaturated hydrocarbon of at least 3 carbon atoms polymerized through the ethylenic unsaturation and the ratio of y:x is no more than about 0.5.

3. The composition of claim 2 wherein the amorphous polyamide has a $T_g$ of at least about 90° C.

4. The composition of claim 3 wherein up to 40 weight percent of the amorphous polyamide consists of units of a lactam, or an ω-aminoacid of 4 to 12 carbon atoms, or units derived from a 4 to 12 carbon atoms aliphatic dicarboxylic acid and a 2 to 12 carbon atom aliphatic diamine.

5. The composition of claim 4 wherein, in the linear alternating polymer, G is a moiety of propylene and the ratio of y:x is from about 0.01 to about 0.1.

6. The composition of claim 2 wherein the amorphous polyamide comprises from about 0.5 wt % to about 10 wt % of the total blend.

7. The composition of claim 6 wherein the amorphous polyamide comprises from about 0.5 wt % to about 5 wt % of the total blend.

8. The composition of claim 3 wherein the amorphous polyamide comprises from about 0.5 wt % to about 1.5 wt % of the total blend.

9. The composition of claim 2 wherein the acidic polymer is present at up to about 5 wt % and comprises a non-neutralized copolymer of ethylene and acrylic acid or methacrylic acid.

10. The composition of claim 2 wherein the acidic polymer is present at up to about 5 wt % and comprises a copolymer of ethylene and acrylic acid or methacrylic acid, partially neutralized with a non-alkali metal.

11. The composition of claim 2 wherein the acidic polymer includes a non-acidic, low molecular weight polymerizable monomer of up to 8 carbon atoms inclusive.

12. The composition of claim 11 wherein the carboxylic acid groups of the acidic polymer are partially neutralized with a non-alkali metal.

13. The composition of claim 4 wherein, in the linear alternating polymer, y is zero.

14. A composition comprising a blend of:
   (1) a major proportion of a linear alternating polymer of carbon monoxide and at least one ethylenically unsaturated hydrocarbon, wherein the linear alternating polymer is represented by the repeating unit formula $$\text{—[CO—[CH}_2\text{—CH}_2\text{]]}_x\text{[CO—[G]]}_y\text{—}$$

wherein G is a moiety of an ethylenically unsaturated hydrocarbon of at least 3 carbon atoms polymerized through the ethylenic unsaturation and the ratio of y:x is no more than about 0.5, and
   (2) from about 0.5 wt % to about 1.5 wt %, based on the total blend, of an amorphous polyamide, wherein the amorphous polyamide comprises:
      (a) 40 to 98 mole percent units of isophthalic acid based on total acids present;
      (b) 2 to 60 mole percent units of terephthalic acid based on total acids present;
      (c) 50 to 98 mole percent units of hexamethylene diamine based on total amines present; and
      (d) 2 to 50 mole percent units, based on total amines present, of at least one aliphatic diamine containing between 8 and 20 carbon atoms and containing at least one cyclohexane moiety; wherein in the amorphous polyamide the mole percent phthalic acids present totals 100 percent and the mole percent diamines present totals 100 percent, and wherein up to 40 weight percent of the amorphous polyamide consists of units of a lactam, or an ω-aminoacid of 4 to 12 carbon atoms, or units derived from a 4 to 12 carbon atoms aliphatic dicarboxylic acid and a 2 to 12 carbon atom aliphatic diamine; and (3) up to about 5 wt %, based on the total blend, of a non-neutralized copolymer of ethylene and acrylic acid or methacrylic acid.

15. The composition of claim 14 wherein the carboxylic acid groups of the acidic polymer are partially neutralized with a non-alkali metal.

16. A composition comprising a blend of:
(1) a major proportion of a linear alternating polymer of carbon monoxide and at least one ethylenically unsaturated hydrocarbon, wherein the linear alternating polymer is represented by the repeating unit formula

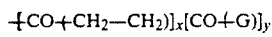

wherein G is a moiety of propylene and the ratio of y:x is from about 0.01 to about 0.1;

(2) from about 0.5 wt % to about 1.5 wt %, based on the total blend, of an amorphous polyamide, wherein the amorphous polyamide comprises:
  (a) 40 to 98 mole percent units of isophthalic acid based on total acids present;
  (b) 2 to 60 mole percent units of terephthalic acid based on total acids present;
  (c) 50 to 98 mole percent units of hexamethylene diamine based on total amines present; and
  (d) 2 to 50 mole percent units, based on total amines present, of at least one aliphatic diamine containing between 8 and 20 carbon atoms and containing at least one cyclohexane moiety;

wherein in the amorphous polyamide the mole percent phthalic acids present totals 100 percent and the mole percent diamines present totals 100 percent, and wherein up to 40 weight percent of the amorphous polyamide consists of units of a lactam, or an ω-aminoacid of 4 to 12 carbon atoms, or units derived from a 4 to 12 carbon atoms aliphatic dicarboxylic acid and a 2 to 12 carbon atom aliphatic diamine; and (3) up to about 5 wt %, based on the total blend, of an acidic polymer incorporating moieties of α-olefin, α,β-ethylenically unsaturated carboxylic acid, and a non-acidic, low molecular weight polymerizable monomer.

17. The composition of claim 16 wherein the carboxylic acid groups of the acidic polymer are partially neutralized with a non-alkali metal.

18. An article manufactured from the composition of claim 1.

* * * * *